United States Patent
Yasugi

(10) Patent No.: US 8,039,979 B2
(45) Date of Patent: Oct. 18, 2011

(54) WIND TURBINE GENERATOR SYSTEM AND METHOD OF CONTROLLING OUTPUT OF THE SAME

(75) Inventor: Akira Yasugi, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 118 days.

(21) Appl. No.: 12/444,623

(22) PCT Filed: Jan. 7, 2009

(86) PCT No.: PCT/JP2009/050093
§ 371 (c)(1),
(2), (4) Date: Apr. 7, 2009

(87) PCT Pub. No.: WO2010/079593
PCT Pub. Date: Jul. 15, 2010

(65) Prior Publication Data
US 2011/0187103 A1    Aug. 4, 2011

(51) Int. Cl.
 *F03D 9/00*    (2006.01)
 *H02P 9/04*    (2006.01)
 *H02P 9/00*    (2006.01)
(52) U.S. Cl. .................. 290/44; 290/55; 322/44
(58) Field of Classification Search .................. None
See application file for complete search history.

(56) References Cited

U.S. PATENT DOCUMENTS

| | | | | |
|---|---|---|---|---|
| 5,225,712 | A * | 7/1993 | Erdman | 290/44 |
| 6,628,103 | B2 * | 9/2003 | Sumiya et al. | 322/20 |
| 7,808,126 | B2 * | 10/2010 | Stiesdal | 307/84 |
| 2011/0103110 | A1 * | 5/2011 | Godridge et al. | 363/74 |
| 2011/0115301 | A1 * | 5/2011 | Bhavaraju et al. | 307/86 |

FOREIGN PATENT DOCUMENTS

| | | |
|---|---|---|
| JP | 04295234 A | 10/1992 |
| JP | 05227800 A | 9/1993 |
| JP | 2001268805 A | 9/2001 |
| JP | 2004260929 A | 9/2004 |
| JP | 2007288847 A | 1/2007 |

* cited by examiner

*Primary Examiner* — Tulsidas C Patel
*Assistant Examiner* — Stefan Mikailoff
(74) *Attorney, Agent, or Firm* — Kanesaka Berner and Partners, LLP

(57) ABSTRACT

It is an object to supply, to the utmost extent, reactive power according to a demand of a utility grid side while maintaining the power factor within a predetermined range. The wind turbine generator system includes a main controller 19. The controller 19 includes a first controller 31 performing constant-reactive-power regulation, a second controller 32 performing constant-power-factor regulation, a judging unit 34 for judging whether a present operating condition is within a predetermined operating region, and a control-switching unit 35 for switching from the first controller 31 to the second controller 32 when the first controller 31 is performing the constant-reactive-power regulation and the judging unit 34 detects a deviation from the operating region.

4 Claims, 6 Drawing Sheets

WIND TURBINE GENERATOR SYSTEM AND METHOD OF CONTROLLING OUTPUT OF THE SAME

CROSS-REFERENCE TO RELATED APPLICATIONS

The present application is based on International Application No. PCT/JP2009/050093, filed Jan. 7, 2009, and priority is hereby claimed under 35 USC §119 based on this application. This application is hereby incorporated by reference in its entirety into the present application.

TECHNICAL FIELD

The present invention relates to a wind turbine generator system and a method of controlling the output of the same.

BACKGROUND ART

Recently, in fields such as wind turbine generator systems, it is required to ensure a power factor within a predetermined range, when electric power is supplied to a utility grid from a wind turbine generator system, in view of stabilizing the power supply in the utility grid.

Accordingly, for example, to keep a constant power factor, constant-power-factor regulation is performed for controlling the active power and the reactive power (for example, Japanese Unexamined Patent Application, Publication No. 2001-268805).

Patent Document 1: Japanese Unexamined Patent Application, Publication No. 2001-268805

DISCLOSURE OF INVENTION

Recently, in order to further stabilize the power supply of the utility grid, one requirement of a utility grid side is that reactive power of a certain level or more should be consistently supplied from a wind turbine generator system to the utility grid. This is based on the fact that the reactive power contributes to stabilization of electric power.

However, for example, in order to supply reactive power in a certain level or more even when the level of the active power is significantly decreased due to wind or other conditions, it is predicted that the power factor will deviate from a predetermined range that is required by the utility grid side. One concern in such a case, for example, is the risk of causing a situation where the operation of a wind turbine must be stopped.

It is an object of the present invention to provide a wind turbine generator system that can supply, to the utmost extent, reactive power according to a demand from a utility grid side while maintaining the power factor within a certain range and to provide a method of controlling the output of the same.

A first aspect of the present invention is a wind turbine generator system having a controlling device that performs output control, wherein the controlling device includes a first controller performing constant-reactive-power regulation for keeping a constant reactive power level; a second controller performing constant-power-factor regulation for keeping a constant power factor; a memory unit for storing information about an operating region defined by the reactive power and the active power, with a power factor within a predetermined range; a judging unit for judging whether a present operating condition is within the operating region stored in the memory unit; and a control-switching unit for switching between the first controller and the second controller, wherein the control- switching unit switches from the first controller to the second controller when the first controller is performing the constant-reactive-power regulation and the judging unit detects a deviation from the operating region.

With such a structure, the constant-reactive-power regulation can be performed within a range not deviating from the operating region, and reactive power of a certain level or more demanded by the utility grid side can be provided to the utmost extent. Furthermore, when a deviation from the operating region occurs, the constant-reactive-power regulation is switched to the constant-power-factor regulation. Consequently, a large deviation from the operating region can be avoided, and the wind turbine can be continuously operated. Accordingly, it is possible to avoid halting the operation of the wind turbine, thereby suppressing a decrease in power generation efficiency.

In the present invention, the priority of the constant-reactive-power regulation is set to be higher than that of the constant-power-factor regulation. Therefore, the constant-reactive-power regulation is preferentially selected within a region not deviating from the operating region.

In the wind turbine generator system, the control-switching unit may be configured to switch the operation from the second controller to the first controller when the second controller is performing the constant-power-factor regulation and the active power level is higher than a threshold value of the active power that is determined by a reactive power command value, which is decided by the constant-reactive-power regulation, and the operating region.

Since the constant-power-factor regulation is automatically switched to the constant-reactive-power regulation when the active power is recovered, it is possible to supply, to the utmost extent, reactive power of a certain level or more to the utility grid.

A second aspect of the present invention is a method of controlling the output of the wind turbine generator system, wherein information about an operating region defined by the reactive power and the active power, with a power factor within a predetermined range, is obtained in advance; and when a deviation of a present operating condition from the operating region is detected while performing constant-reactive-power regulation for keeping a constant reactive power level, the constant-reactive-power regulation is switched to the constant-power-factor regulation.

In the method of controlling the output of a wind turbine generator system, it may be configured such that the constant-power-factor regulation is switched to the constant-reactive-power regulation when the constant-power-factor regulation is being performed and the active power level is higher than a threshold value of the active power that is determined by a reactive power command value set in the constant-reactive-power regulation and the operating region.

EXPLANATION OF REFERENCE SIGNS

Figure 1:
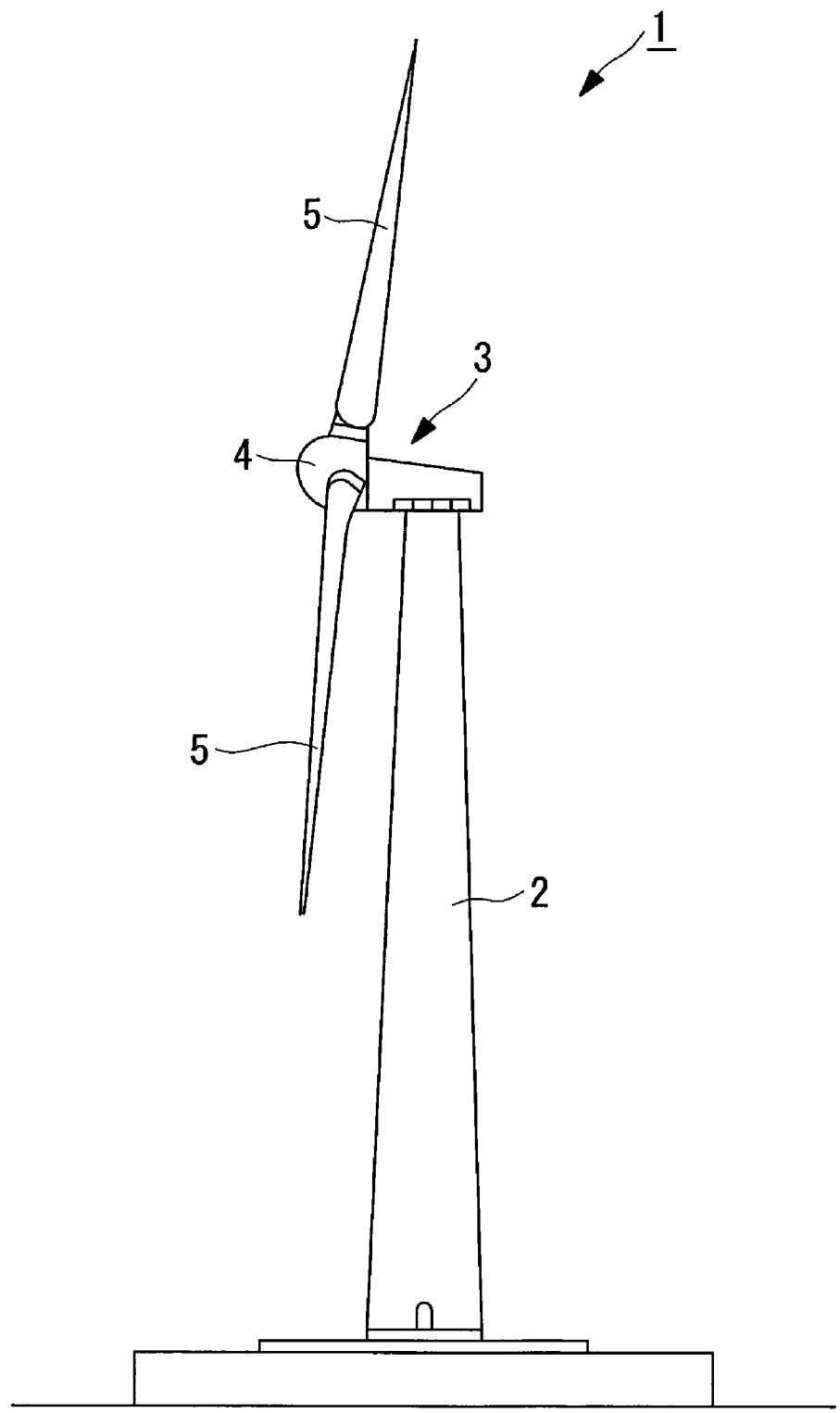
FIG. 1 illustrates the overall configuration of a wind turbine generator system according to an embodiment of the present invention.

1: wind turbine generator system
2: tower
3: nacelle
4: rotor head
5: wind turbine blade
6: generator
13: utility grid
14: active rectifier
15: DC bus
16: inverter
17: AC-DC-AC converter
19: main controller (controlling device)
21: converter-driving controller
22: blade controller
V: generator output voltage
I: generator output current
P: active power
Q: reactive power
P*: active power command
Q*: reactive power command
β: blade pitch angle
β*: pitch command
31: first controller, for reactive power regulation
32: second controller, for power factor regulation
33: memory unit
34: judging unit
35: control-switching unit

BEST MODE FOR CARRYING OUT THE INVENTION

An embodiment of the wind turbine generator system according to the present invention will be described below with reference to the drawings.

FIG. 1 is a drawing illustrating the overall configuration of a wind turbine generator system. As shown in FIG. 1, the wind turbine generator system 1 includes a tower 2, a nacelle 3 mounted atop the tower 2, and a rotor head 4 provided on the nacelle 3 so as to be rotatable around an approximately horizontal axis. The rotor head 4 is fitted with three wind turbine blades 5 that are arranged radially around the rotation axis thereof. As a result, the force of wind blowing against the wind turbine blades 5 from the direction of the rotation axis of the rotor head 4 is converted into motive energy causing the rotor head 4 to rotate around the rotation axis. This motive energy is converted into electrical energy by the generator 6 disposed in the nacelle 3.

Figure 2:
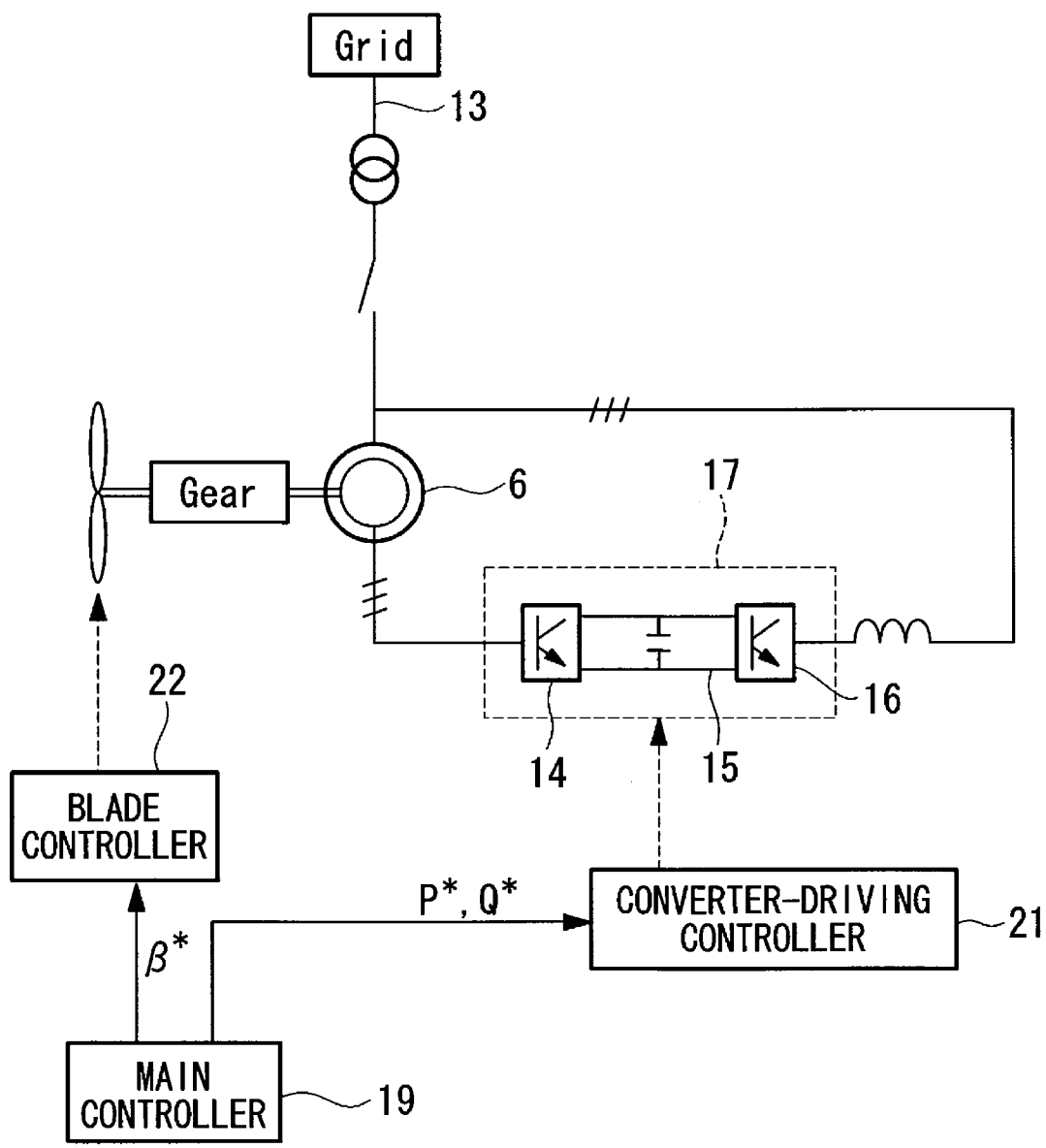
FIG. 2 is a block diagram illustrating an example of the configuration of a generator and its periphery.

FIG. 2 is a block diagram illustrating an example of the configuration of the generator 6 and its periphery. The generator 6 of this embodiment is configured to output the electric power generated by the generator 6 to the utility grid 13 from both a stator winding and a rotor winding. Specifically, in the generator 6, the stator winding is connected to the utility grid 13, and the rotor winding is connected to the utility grid 13 via an AC-DC-AC converter 17.

The AC-DC-AC converter 17 is composed of an active rectifier (converter) 14, a DC bus 15, and an inverter 16 and converts AC power received from the rotor winding into AC power that matches the frequency of the utility grid 13. The active rectifier 14 converts AC power generated in the rotor winding into DC power and outputs the DC power to the DC bus 15. The inverter 16 converts the DC power received from the DC bus 15 into AC power having the same frequency as that of the utility grid 13 and outputs the AC power.

The AC-DC-AC converter 17 also has a function to convert the AC power received from the utility grid 13 into AC power that matches the frequency of the rotor winding and is also used for exciting the rotor winding depending on the operating conditions of the wind turbine generator system 1. In this case, the inverter 16 converts AC power into DC power and outputs the DC power to the DC bus 15. The active rectifier 14 converts the DC power received from the DC bus 15 into AC power that matches the frequency of the rotor winding and supplies the AC power to the rotor winding of the generator 6.

Furthermore, an electrical line for connecting the generator 6 to the utility grid 13 is provided with a current/voltage sensor (not shown) for measuring output voltage V and output current I of the generator 6. The measurement value from this current/voltage sensor is given to a main controller 19 and a converter-driving controller 21.

The converter-driving controller 21 controls the active rectifier 14 and the ON/OFF state of the power transistors of the inverter 16 in order to control the active power P and the reactive power Q that are outputted to the utility grid 13 in response to active power command P* and reactive power command Q* given by the main controller (controlling device) 19 described below. Specifically, the converter-driving controller 21 calculates the active power P and the reactive power Q based on the output voltage V and the output current I measured by the current/voltage sensor. Furthermore, the converter-driving controller 21 produces a PWM signal such that a difference between the active power P and the active power command P* and a difference between the reactive power Q and the reactive power command Q* are zero and supplies the produced PWM signal to the active rectifier 14 and the inverter 16. By doing so, the active power P and the reactive power Q supplied to the utility grid 13 are controlled.

Regarding the reactive power Q, depending on whether the power factor demanded by the utility grid side is lagging or leading, it is determined whether reactive power should be supplied to the utility grid 13 from the wind turbine generator system 1 or reactive power should be supplied to the wind turbine generator system 1 from the utility grid 13. In the description of this application, the term "to supply reactive power" in the lagging power factor means to supply negative reactive power to the utility grid 13.

A blade controller 22 controls the pitch angle β of the blades 5 in response to a pitch command β* sent from the main controller 19. The pitch angle β of the blades 5 is controlled so as to coincide with the pitch command β*.

The main controller 19 outputs separate command values appropriate for the respective converter-driving controller 21 and blade controller 22. The converter-driving controller 21, the blade controller 22, and the main controller 19 have, for example, a microcomputer. The microcomputer reads out a program recorded in a computer-readable recording medium and executes the program, thereby achieving various processes. The computer-readable recording medium herein is, for example, a magnetic disc, a magneto-optical disc, a CD-ROM, a DVD-ROM, or a semiconductor memory.

Figure 3:
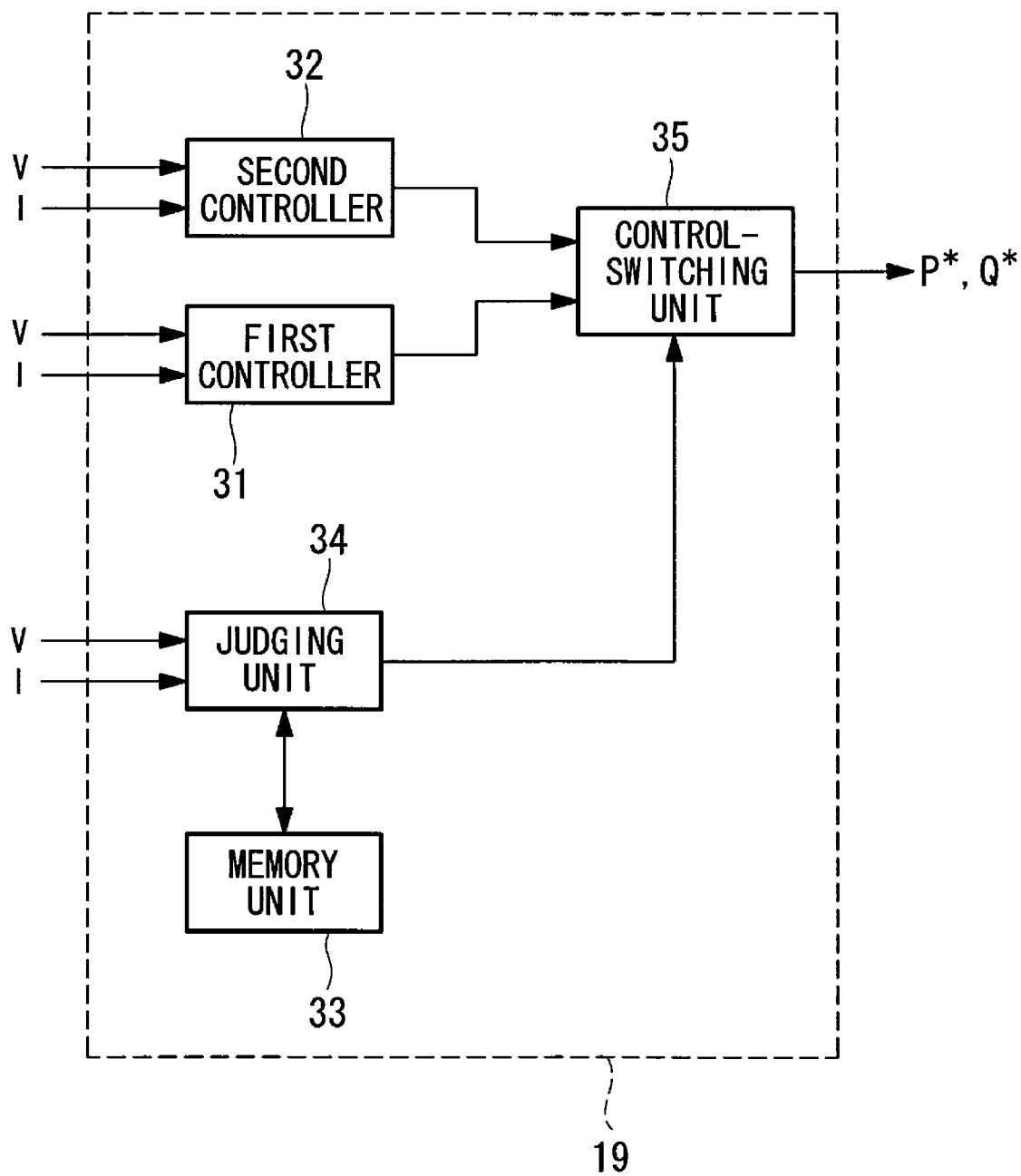
FIG. 3 is a functional block diagram illustrating, in expanded form, the process implemented by the main controller shown in FIG. 2.

FIG. 3 is a functional block diagram illustrating, in expanded form, the functions of the main controller 19. As shown in FIG. 3, the main controller 19 includes a first controller 31 performing constant-reactive-power regulation for keeping a constant reactive power level; a second controller 32 performing constant-power-factor regulation for keeping a constant power factor; a memory unit 33 for storing information about an operating region defined by the reactive power and the active power, with a power factor within a predetermined range; a judging unit 34 for judging whether a present operating condition is within the operating region stored in the memory unit 33; and a control-switching unit 35 for switching between the first controller 31 and the second controller 32, in other words, for switching between constant-reactive-power regulation and constant-power-factor regulation.

Figure 4:
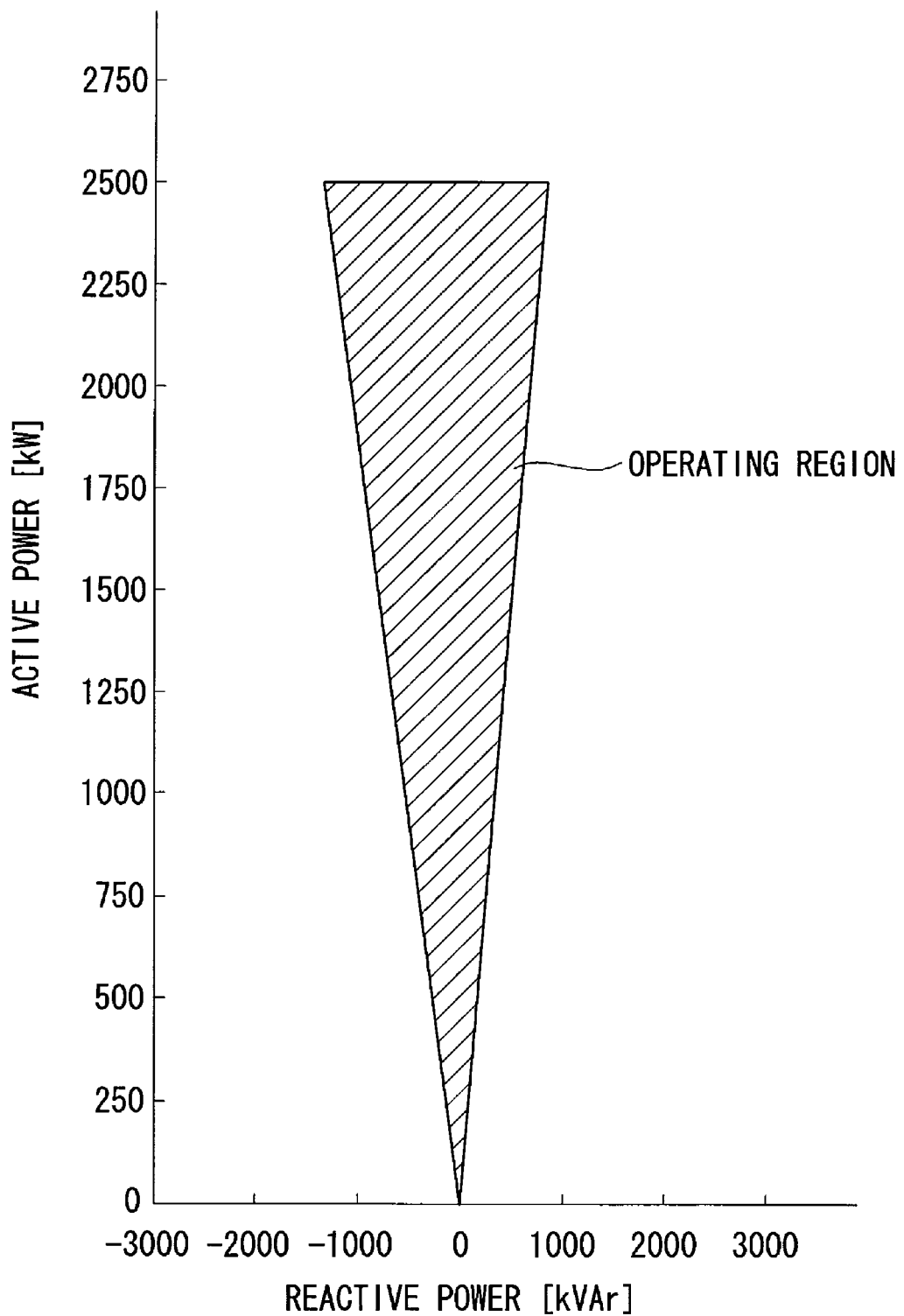
FIG. 4 is a graph illustrating an example of an operating region.

FIG. 4 shows information about an operating region stored in the memory unit 33. Here, for example, the relationship between the reactive power and the active power when the power factor is in the range of −0.9 or more and +0.95 or less. In FIG. 4, the vertical axis represents the active power P, and the horizontal axis represents the reactive power Q. In the drawing, the region indicated by hatching is an operating region, that is, the ranges of the reactive power and the active power for setting the power factor in the range of −0.9 or more and +0.95 or less.

In FIG. 3, the first controller 31 has a preset reactive power value that is required by the utility grid side, and this reactive power value is set as the reactive power command value Q*. In this embodiment, an example where the reactive power command value Q* is set at −600 kVAr is shown.

The first controller 31 determines an active power command value P* by a prescribed calculation based on the rotational speed of the generator 6.

Once the first controller 31 sets the reactive power command value Q* and the active power command value P* in this way, it outputs these command values to the control-switching unit 35.

The second controller 32 has, for example, a preset power factor (for example, a lagging power factor of 0.9) that is required by the utility grid side, sets a reactive power command Q* and an active power command value P* such that the power factor has the above-mentioned value, and outputs them. For example, the second controller 32 obtains an active power command value P* that is determined from the relationship with the rotational speed of the generator 6, calculates a reactive power command value Q* that satisfies the preset power factor (for example, a lagging power factor of 0.9) based on the relationship with this active power command value P*, and outputs these command values to the control-switching unit 35.

The judging unit 34 calculates active power P and reactive power Q based on the output voltage V and the output current I measured by the current/voltage sensor, judges whether these values are within the operating region, shown in FIG. 4, stored in the memory unit 33, and outputs the result to the control-switching unit 35. At this time, the judging unit 34 also outputs the information about the active power P and the reactive power Q calculated based on the output voltage V and the output current I to the control-switching unit 35.

Furthermore, when the constant-power-factor regulation is performed, the judging unit 34 judges whether the active power is higher than a threshold value (1250 kW, in this embodiment) of the active power determined based on the operating region and the reactive power command value (−600 kVAr, in this embodiment) set in the constant-reactive-power regulation (refer to FIG. 4) and outputs the judgment result to the control-switching unit 35. The threshold value can be arbitrarily set within the operating region, and, for example, an active power value that makes the power factor −0.9 (a lagging power factor of 0.9) is employed based on the relationship with the reactive power command value set in the constant-reactive-power regulation.

The control-switching unit 35 is means for switching output control and selects either the first controller 31 or the second controller 32.

In this embodiment, the constant-reactive-power regulation is set to have higher priority than the constant-power-factor regulation. Therefore, in a region not deviating from the operating region, the constant-reactive-power regulation is preferentially selected in the control-switching unit 35.

In addition, for example, the control-switching unit 35 switches from the first controller 31 to the second controller 32 when the first controller 31 is performing the constant-reactive-power regulation and the judging unit 34 detects a deviation from the operating region.

Furthermore, the control-switching unit 35 switches from the second controller 32 to the first controller 31 when the second controller 32 is performing the constant-power-factor regulation and the judging unit 34 detects active power higher than the threshold value.

Next, a method of controlling the output of the wind turbine generator system according to this embodiment, in other words, the content of the process implemented by the main controller 19, will be described with reference to FIGS. 5 and 6.

First, when a wind turbine starts operating (step SA1 in FIG. 5), the control-switching unit 35 selects the first controller 31. By doing so, constant-reactive-power regulation by the first controller 31 is employed (step SA2 in FIG. 5), and a reactive power command value Q* and an active power command value P* for keeping a constant reactive power level are outputted from the main controller 19 to the converter-driving controller 21.

The converter-driving controller 21 controls the active rectifier 14 and the inverter 16 such that the active power P and the reactive power Q calculated from the output voltage V and the output current I measured by the current/voltage sensor coincide with the active power command value P* and the reactive power command value Q*, respectively, given by the main controller 19. With this, active power P and reactive power Q for keeping a constant reactive power level are supplied to the utility grid 13 (step SA3 in FIG. 5).

Figure 5:
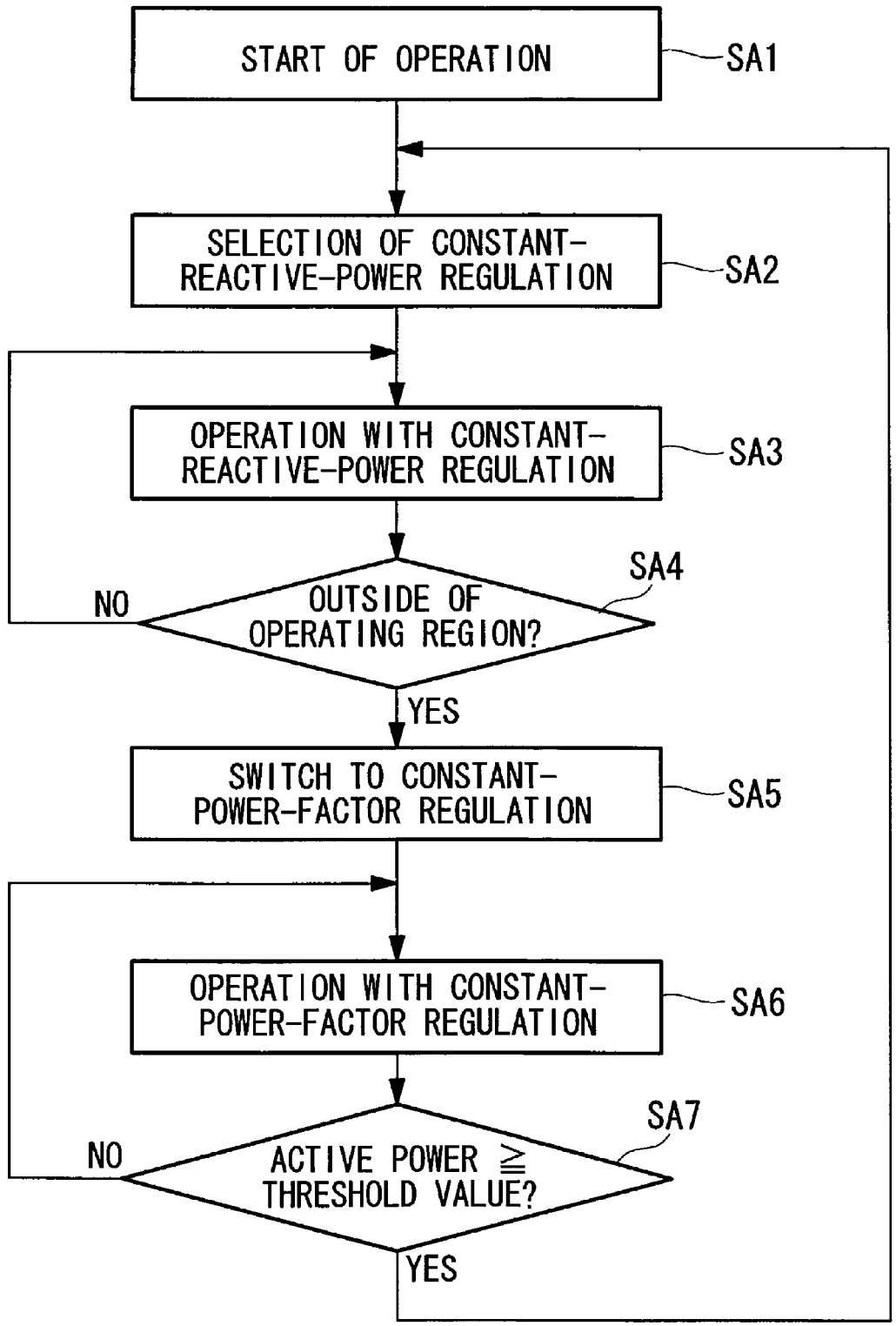
FIG. 5 is a flow chart showing the output control of a wind turbine generator system according to an embodiment of the present invention.
Figure 6:
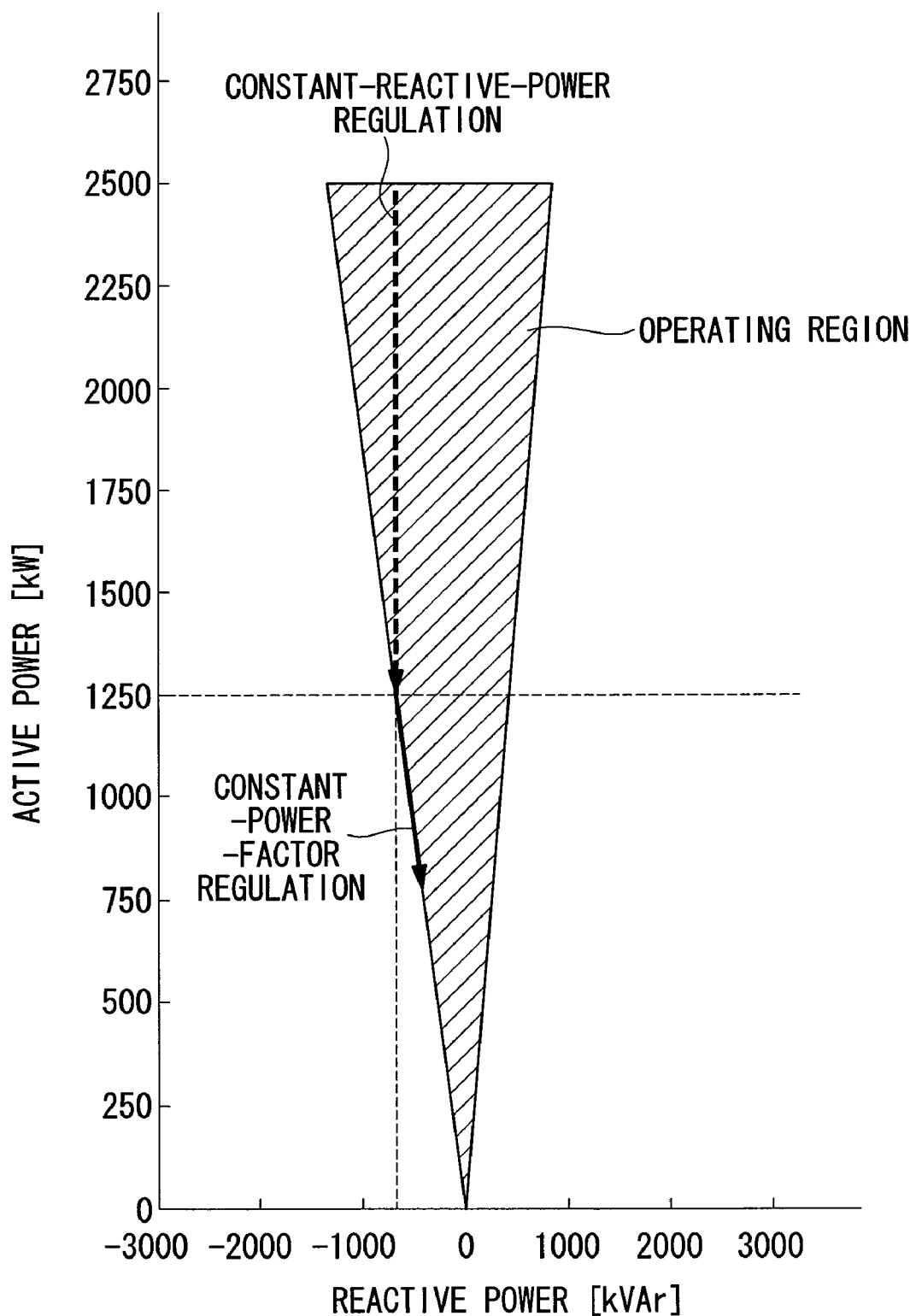
FIG. 6 is a graph for describing the output control of a wind turbine generator system according to an embodiment of the present invention.

When such constant-reactive-power regulation is performed, for example, if wind conditions are drastically changed such that the active power P is significantly decreased so as to reach 1250 kW or less, which deviates from the operating region, as indicated by the arrow in a thick dashed line in FIG. 6, the judging unit 34 detects the deviation from the operating region. Information about this deviation is supplied to the control-switching unit 35 (step SA4 in FIG. 5).

Once the control-switching unit 35 receives the signal indicating the deviation from the operating region, it switches from the first controller 31 to the second controller 32, thus switching the type of regulation from constant-reactive-power regulation to constant-power-factor regulation (step SA5 in FIG. 5).

Accordingly, the active power command P* and the reactive power command Q* that are set by the second controller 32 for keeping a constant power factor are selected, and these commands are outputted to the converter-driving controller 21.

By doing so, active power P and reactive power Q for keeping a constant power factor are supplied to the utility grid 13 (step SA6 in FIG. 5).

Thus, when a deviation from the operating region occurs, the constant-reactive-power regulation is switched to the constant-power-factor regulation. Consequently, as shown by the thick arrow in FIG. 6, controlled operation of the wind turbine can be continuously performed by avoiding deviation from the operating region even when the active power is decreased.

While performing constant-power-factor regulation is being performed in this way, the active power is gradually recovered. As a result, for example, when the active power exceeds a threshold value of the active power that is determined by the operating region shown in FIG. 4 and the reactive power command value set in the constant-reactive-power regulation, the judging unit 34 detects this and outputs the information to the control-switching unit 35 (step SA7 in FIG. 5).

For example, in this embodiment, since the constant-reactive-power regulation is performed to keep a reactive power level of −600 kVAr, the threshold value of the active power that is determined based on this set point and the operating region becomes 1250 kW, as shown in FIG. 6. This value is only an example and can be properly set in the above-described manner. Furthermore, with regard to such a threshold value, the threshold value of the active power may be set in consideration of a margin such that the system can operate safely.

When the control-switching unit 35 receives this information, it switches from the second controller 32 to the first controller 31 (step SA2 in FIG. 5). Accordingly, the constant-reactive-power regulation is performed again by the first controller 31 (step SA3 in FIG. 5).

Thus, even if the active power is initially decreased, when the active power level is recovered afterward, the operation is automatically switched to the constant-reactive-power regulation. Consequently, reactive power of a certain level or more can, to the utmost extent, be supplied to the utility grid 13.

As described above, in the wind turbine generator system and the method of controlling the operation thereof according to this embodiment, when a deviation from the operating region is caused by a decrease in the active power, the operation is rapidly switched from the constant-reactive-power regulation to the constant-power-factor regulation. Therefore, the power factor can be maintained within a predetermined range, and it is possible to avoid halting the operation of the wind turbine, thereby suppressing a decrease in power generation efficiency.

When the active power is recovered, the operation is automatically switched from the constant-power-factor regulation to the constant-reactive-power regulation. Consequently, reactive power of a certain level or more can, to the utmost extent, be supplied to the utility grid 13.

Furthermore, in this embodiment, the case where negative reactive power is supplied is described as an example, but the method of controlling the output of the wind turbine generator system according to the present invention can be equally applied to a case where positive reactive power is supplied.

The invention claimed is:

1. A wind turbine generator system having a controlling device that performs output control, wherein the controlling device comprises:

a first controller performing constant-reactive-power regulation for keeping a constant reactive power level;

a second controller performing constant-power-factor regulation for keeping a constant power factor;

a memory unit for storing information about an operating region defined by the reactive power and an active power, with a power factor within a predetermined range;

a judging unit for judging whether a present operating condition is within the operating region stored in the memory unit; and a control-switching unit for switching between the first controller and the second controller, wherein the control-switching unit switches from the first controller to the second controller when the first controller is performing the constant-reactive-power regulation and the judging unit detects a deviation from the operating region.

2. The wind turbine generator system according to claim 1, wherein the control-switching unit switches from the second controller to the first controller when the second controller is performing the constant-power-factor regulation and the active power level is higher than a threshold value of the active power that is determined by the reactive power command value set in the constant-reactive-power regulation and the operating region.

3. A method of controlling the output of a wind turbine generator system, wherein information about an operating region defined by the reactive power and an active power, with a power factor within a predetermine range, is obtained in advance; and when a deviation of a present operating condition from the operating region defined by the reactive power and the active power, with a power factor within a predetermined range, is detected while performing constant-reactive-power regulation for keeping a constant reactive power level, the constant-reactive-power regulation is switched to the constant-power-factor regulation for controlling the active power and the reactive power such that the power factor is constant.

4. The method of controlling the output of a wind turbine generator system according to claim 3, wherein the constant-power-factor regulation is switched to the constant-reactive-power regulation when the constant-power-factor regulation is being performed and an active power level is higher than a threshold value of the active power that is determined by a reactive power command value set in the constant-reactive-power regulation and the operating region.

* * * * *